(12) United States Patent
Stuart

(10) Patent No.: US 7,700,010 B2
(45) Date of Patent: Apr. 20, 2010

(54) BINARY OPTICAL COMPOUND AND METHOD OF MANUFACTURE

(75) Inventor: Jeffrey A. Stuart, Columbia, CT (US)

(73) Assignee: Syracuse University, Syracuse, NY (US)

( * ) Notice: Subject to any disclaimer, the term of this patent is extended or adjusted under 35 U.S.C. 154(b) by 0 days.

(21) Appl. No.: 11/778,377

(22) Filed: Jul. 16, 2007

(65) Prior Publication Data

US 2008/0035897 A1 Feb. 14, 2008

Related U.S. Application Data

(60) Provisional application No. 60/807,372, filed on Jul. 14, 2006.

(51) Int. Cl.
*G02B 5/23* (2006.01)

(52) U.S. Cl. .................. 252/586; 435/4; 435/288.7; 204/157.15

(58) Field of Classification Search ............... 252/586; 204/157.15; 435/4, 288.7
See application file for complete search history.

(56) References Cited

U.S. PATENT DOCUMENTS 7,378,219 B2 * 5/2008 Jensen et al. ........... 430/270.14

2004/0223323 A1 * 11/2004 Jensen et al. ............... 362/200
2008/0057490 A1 * 3/2008 Stuart et al. .................. 435/4

OTHER PUBLICATIONS

Stuart, J.A., D.L. Marcy, K.J. Wise, and R.R. Birge, Biomolecular electronic device applications of bacteriorhodopsin, in Molecular Electronics: Bio-sensors and Bio-computers, L.E.A. Barasanti, Editor. 2003, Kluwer Academic Publishers. p. 265-299.*

Bradley R. Kelemen, Mai Du, Rasmus B. Jensen, Proteorhodopsin in living color: diversity of spectral properties within living bacterial cells.Biochimica et Biophysica Acta 1618 (2003) 25-32 by Elsevier.*

Bradley R. Kelemen, Mai Du, Rasmus B. Jensen, Proteorhodopsin in living color: diversity of spectral properties within living bacterial cells, Biochimica et Biophysica Acta 1618 (2003) 25-32, Elsevier B.V. All rights reserved.*

* cited by examiner

*Primary Examiner*—Ling-Siu Choi
*Assistant Examiner*—Bijan Ahvazi
(74) *Attorney, Agent, or Firm*—George R. McGuire; Bond Schoeneck & King, PLLC

(57) ABSTRACT

A binary optical compound formed from a preparation of proteorhodopsin, is provided. The preparation is prepared by dissolving proteorhodopsin in distilled water, where the pH is adjusted to be above 11 either by using sodium hydroxide or an appropriate buffer. The preparation is then illuminated with either white light sources, lasers, or irradiation provided from light-emitting diodes. The necessary duration is intensity dependent, varying from a few seconds to a few minutes, depending upon the source and actinic wavelength. The resulting compound has a long lifespan and may be efficiently transitioned between states.

10 Claims, 1 Drawing Sheet

BINARY OPTICAL COMPOUND AND METHOD OF MANUFACTURE

CROSS REFERENCE TO RELATED APPLICATIONS

The present application claims priority to U.S. Provisional Application No. 60/807,372, filed on Jul. 14, 2006.

BACKGROUND OF THE INVENTION

1. Field of Invention

The present invention relates to binary optical compounds and, more specifically, to a preparation of proteorhodopsin that may transition between binary optical states.

2. Description of Prior Art

Proteorhodopsin (PR) is the general name for a class of closely-related photoactive proteins isolated from marine organisms referred to as the γ-proteobacteria, or group SAR86. This class of protein has been shown to be remarkably similar to the related photoactive protein isolated from *Halobacterium salinarum*, bacteriorhodopsin (BR), sharing a homologous structure, chromophore, and light-driven proton-pumping activity. Like bacteriorhodopsin, proton pumping in the proteorhodopsins results after the all-trans retinal chromophore absorbs light and isomerizes to 13-cis, which in turn stimulates a characteristic response in the protein, referred to as a photocycle. The photocycle is composed of a number of transient protein intermediates, each spectrally and temporally distinct. Although not identical and somewhat slower, the proteorhodopsin photocycle contains analogs to the K, L, M, and N/O intermediates of the bacteriorhodopsin photocycle. The biophysical nature of these intermediates remains uncertain, although similarities to those in bacteriorhodopsin are assumed, especially in light of the level of conserved amino acids. However, comparisons between these two protein families are limited and should be viewed with caution, considering differences in both the native environment and host organism. It is also important to note that at this time all proteorhodopsin is produced recombinantly by expression of the protein in *E. coli*. As such, the protein's morphology is different from the most commonly used form of bacteriorhodopsin, i.e., purple membrane. The purple membrane is the plasma membrane and protein construct that is isolated directly from the host organism, *Halobacterium salinarum*. Therefore, BR remains imbedded in its native membrane, whereas proteorhodopsin isolated from *E. coli* is detergent solubilized, which is advantageous to many device applications.

To date, two primary classes of proteorhodopsins have been found, green and blue, characterized by the region of the visual spectrum containing each protein's respective absorption maximum. The green proteorhodopsins (BAC31A8 and related) were the first to be described, having a resting state absorption maximum at about 520 nm (at pH>8, 540 nm at pH<7). The blue proteorhodopsins (HOT75M1 and related) have a resting state absorption maximum of about 490 nm (high pH, ~530 nm at low pH). This variation in spectral sensitivity has been strongly correlated to the marine depths at which the host organisms reside, with the blue proteorhodopsins being found at greater depths than the green.

The photoactive protein bacteriorhodopsin has been a candidate for the active element in a wide range of device applications, ranging from memory storage and holographic materials to nondestructive testing and security inks. All of these applications rely on the protein's unique response to light. The basis for the former applications is the protein's ability to exist in multiple states, defined by unique absorption profiles (i.e., photocycle intermediates); the M and O intermediates have become particularly important. A large number of BR-based applications have been described in the literature. One of the most important innovations in bacteriorhodopsin research was the discovery and characterization of a permanent state, denoted as Q. The Q-state is accessed from the BR O-state by exposure to red light (the purported branched photocycle), and has a 9-cis retinal chromophore that is trapped, but unbound, in the protein-binding site. Exposure to blue light restores the BR resting state. The combination of permanence and wide spectral separation between Q (~380 nm) and the bR resting state (570 nm) makes BR a good candidate for holographic materials and optical memories. However, in the wild-type protein the bR to Q transition takes place with very poor efficiency, mandating the use of high intensity irradiation and prolonged exposures.

SUMMARY OF THE INVENTION

It is a principal object and advantage of the present invention to provide a binary optical compound.

It is an additional object and advantage of the present invention to provide a binary optical compound that is easy to prepare.

It is a further object and advantage of the present invention to provide a binary optical compound that has efficient transitional properties.

It is another object and advantage of the present invention to provide a binary optical compound that may be repeatedly cycled between states.

Other objects and advantages of the present invention will in part be obvious, and in part appear hereinafter.

In accordance with the foregoing objects and advantages, an embodiment of the present invention comprises a binary optical compound formed from proteorhodopsin. The preparation is prepared by dissolving proteorhodopsin in distilled water. Next the pH is adjusted to be above 11 using sodium hydroxide or by use of the appropriate buffer. The preparation is then illuminated with either white light sources, lasers, or irradiation provided from light-emitting diodes.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
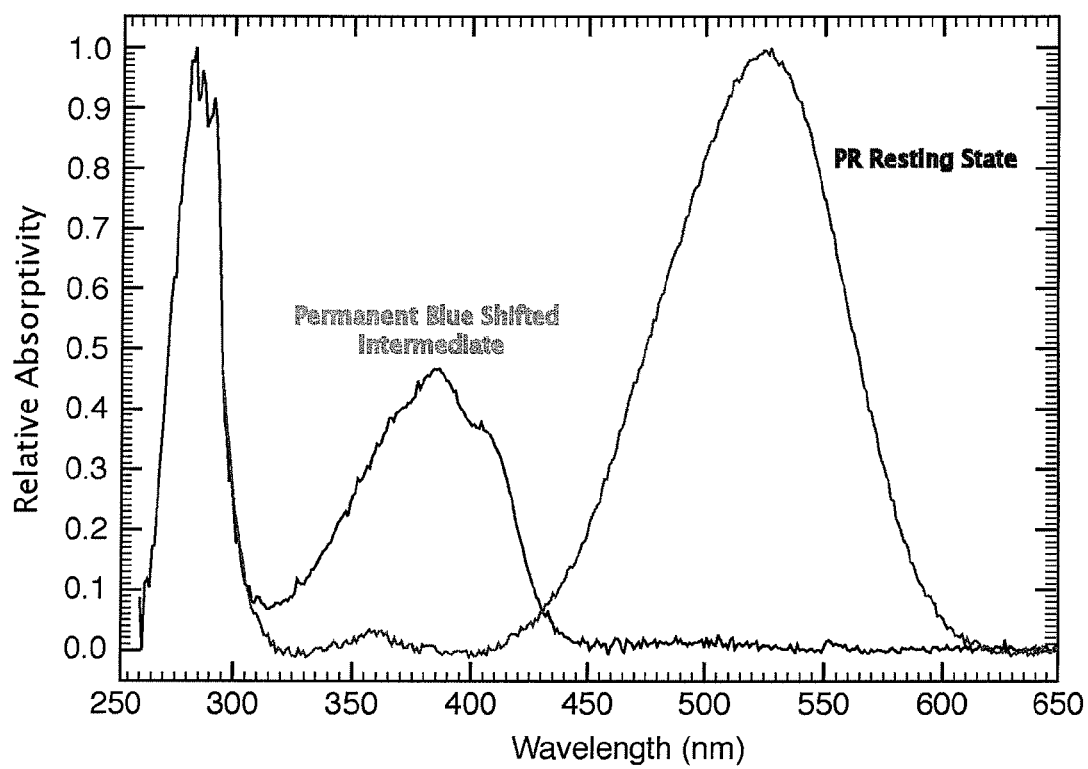
FIG. 1 is a graph of the spectrum of the optical states of a binary optical compound according to an embodiment of the present invention.

Referring now to the drawings, wherein like numerals refer to like parts throughout, an embodiment of the present invention comprises a binary optical compound formed from a preparation of proteorhodopsin. Like bacteriorhodopsin, proteorhodopsin has a state that may be used for protein-based holography and optical memory applications (to be referred to herein as the blue-shifted intermediate, or BSI). This state may be produced under certain conditions in both the blue and green forms of the protein. Furthermore, this state is expected to be produced similarly by the many PR variants that are described in the literature. Like a BR Q-state, the PR BSI is blue-shifted to a wavelength less than 400 nm (~390 nm), has proven to be extremely long-lived under the appropriate experimental conditions (>24 hours), and can be reversibly driven back to the pR resting state. However, unlike the BR Q-state, the PR BSI can be produced with much higher efficiency. In wild-type bacteriorhodopsin, the protein must be encapsulated in a polymer matrix and exposed to high light intensities (e.g., from lasers) in order to generate measurable amounts of Q. Such conditions are unnecessary for PR as the BSI can be generated in solution with simple white light sources or light-emitting diodes. Furthermore, proteorhodopsin can be repeatedly cycled back and forth between the resting state and the BSI, utilizing the appropriate frequencies of light. As such, the BSI potentially provides the basis for a number of binary optical materials for use in applications such as nonvolatile computer memories (both binary optical and holographic)

The preparation of a binary optical compound (of permanent BSI in both the green and blue PR variants) according to an embodiment of the present invention begins by dissolving proteorhodopsin (green PR from Bac31A8; blue PR from Hot75 ml) in distilled water to a final optical density of approximately 0.5-1 a.u. (the final concentration is not relevant to the production of the BSI, as long as adequate light to ensure photoconversion is provided). Sodium hydroxide (0.05M) is used to adjust the pH to >11. Use of an appropriate buffer is optional (permanent BSI may be produced with or without a buffer). The preparation is then illuminated with either white light sources, lasers, or irradiation provided from light-emitting diodes (470 nm for blue PR, 520 nm for green PR). The necessary duration is intensity dependent, varying from a few seconds to a few minutes, depending upon the source and actinic wavelength.

A spectrum of the state, according to an embodiment of the present invention, is shown in FIG. 1. The state can be erased by exposure to 380 nm light (any wavelength within the state's visible absorption band can be used for erasure). Erasing drives the BSI back to the PR resting state. As such, the blue-shifted intermediates from both the blue and green variants can be repeatedly generated and erased, with only slight loss of protein.

The following process resulted in the spectrum illustrated in FIG. 1, after preparing the sample as described above:

1. After generating a standard UV/VIS spectrum of the unphotolyzed sample, it was illuminated with a broad-band white-light source delivered through a fiber optic cord;
2. Continuous illumination for two minutes was provided through the top of the plastic cuvette holding the sample (sample was kept in a Cary-50 UV/VIS Spectrometer for ease of monitoring sample response);
3. After illumination was completed, another spectrum of the sample was generated;
4. The sample was allowed to rest in the dark for 20 minutes, and another spectrum was generated.

At this point, three spectral features remain, including the primary resting state PR absorbance in the visible (520 nm for green PR, 490 nm for blue), the absorption in the UV corresponding to peptide bonds and aromatic amino acids (i.e., the general protein band at ~280 nm), and the BSI, centered at about 390 nm. Generation of difference spectra shows that the BSI results from photolysis of the PR resting state. As noted previously, the BSI is stable as long as it is protected from blue light. Erasure of the BSI is done easily with a 380 nm LED (light-emitting diode). The lifespan for the preparation described above is a minimum of 20 hours (i.e., no degradation of the BSI occurred after 20 hours of continuous observation).

What is claimed is:

1. A binary optical compound, comprising:
   a solution of dissolved proteorhodopsin having a pH greater than 11, wherein said dissolved proteorhodopsin includes a blue shifted intermediate state having a maximum relative absorptivity between 325 and 425 nanometers and a lifespan of at least 20 hours in response to continuous illumination by a broad band white light source for two minutes.

2. The binary optical compound of claim 1, wherein said blue shifted intermediate comprises a blue shifted wavelength of less than 400 nm.

3. The binary compound of claim 2, wherein said blue shifted intermediate is operable to reversibly cycle between a proteorhodopsin resting state and said blue shifted intermediate upon exposure to a wavelength of light.

4. A method of forming a binary optical compound, comprising the steps of:
   dissolving proteorhodopsin in distilled water to form a solution;
   adjusting a pH of said solution to be greater than 11, wherein said dissolved proteorhodopsin includes a blue shifted intermediate state having a maximum relative absorptivity between 325 and 425 nanometers and a lifespan of at least 20 hours in response to continuous illumination by a broad band white light source for two minutes.

5. The method of claim 4, wherein said blue shifted intermediate comprises a blue shifted wavelength of less than 400 nm.

6. The method of claim 5, wherein said dissolved proteorhodopsin comprises green proteorhodopsin having a resting state absorbance of between 500 and 550 nm, and blue proteorhodopsin having a resting state absorbance of between 450 and 500 nm.

7. The method of claim 6, further comprising the step of reversibly forming said green proteorhodopsin resting state and said blue proteorhodopsin resting state from said blue shifted intermediate.

8. The method of claim 7, wherein the step of reversibly forming further comprises the step of exposing said blue shifted intermediate to an illumination source illuminating between 300 and 450 nm of light.

9. The method of claim 4, wherein said step of adjusting further comprises the step of adding sodium hydroxide to said solution.

10. The method of claim 4, wherein the step of adjusting further comprises the step of adding a buffer to said solution.

* * * * *